United States Patent
Baughman et al.

(10) Patent No.: US 11,341,689 B1
(45) Date of Patent: May 24, 2022

(54) DYNAMIC VIRTUAL AUDIENCE GENERATION

(71) Applicant: International Business Machines Corporation, Armonk, NY (US)

(72) Inventors: Aaron K Baughman, Cary, NC (US); Sai Krishna Reddy Gudimetla, Jersey City, NJ (US); Stephen C Hammer, Marietta, GA (US); Jeffrey D. Amsterdam, Roswell, GA (US); Sherif A. Goma, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 17/089,758

(22) Filed: Nov. 5, 2020

(51) Int. Cl.
| | |
|---|---|
| *G06T 11/00* | (2006.01) |
| *G06N 3/04* | (2006.01) |
| *G06Q 30/02* | (2012.01) |
| *G06N 3/08* | (2006.01) |
| *G06Q 50/00* | (2012.01) |

(52) U.S. Cl.
CPC ............ *G06T 11/00* (2013.01); *G06N 3/0454* (2013.01); *G06N 3/08* (2013.01); *G06Q 30/0201* (2013.01); *G06Q 30/0205* (2013.01); *G06Q 50/01* (2013.01)

(58) Field of Classification Search
CPC ........ G06T 11/00; G06N 3/0454; G06N 3/08; G06Q 30/0201; G06Q 30/0205; G06Q 50/01
See application file for complete search history.

(56) References Cited

U.S. PATENT DOCUMENTS

| | | | |
|---|---|---|---|
| 9,030,522 B2 | 5/2015 | Hines | |
| 9,066,144 B2 | 6/2015 | Yerli | |
| 9,514,381 B1 | 12/2016 | Ludwigsen | |
| 2014/0029920 A1 | 1/2014 | Sitrick | |
| 2019/0102941 A1* | 4/2019 | Khan | .................... G06T 19/006 |

(Continued)

FOREIGN PATENT DOCUMENTS

| | | |
|---|---|---|
| CN | 104159005 A | 11/2014 |
| CN | 105138296 B | 12/2015 |

(Continued)

OTHER PUBLICATIONS

Ahmed et al., "Automatic Video Background Replacement Using Shape-Based Probabilistic Spatio-Temporal Object Segmentation", ICICS 2007, ©2007 IEEE, 4 pages.

(Continued)

*Primary Examiner* — Maurice L. McDowell, Jr.
(74) *Attorney, Agent, or Firm* — Randy E. Tejeda

(57) ABSTRACT

One or more computer processors create a user-event localization model for an identified remote audience member in a plurality of identified remote audience members for an event. The one or more computer processors generate a virtual audience member based the identified remote audience member utilizing a trained generated adversarial network and one or more user preferences. The one or more computer processors present the generated virtual audience member in a location associated with the event. The one or more computer processors dynamically adjust a presented virtual audience member responsive to one or more event occurrences utilizing the created user-event localization model.

20 Claims, 4 Drawing Sheets

(56) References Cited

U.S. PATENT DOCUMENTS

| | | | |
|---|---|---|---|
| 2020/0065526 | A1 | 2/2020 | Berman |
| 2020/0118312 | A1 | 4/2020 | Ahuja |
| 2020/0296148 | A1* | 9/2020 | Lueth .................. H04L 65/4015 |
| 2020/0404344 | A1* | 12/2020 | Bathory .................. H04N 21/44 |
| 2021/0398032 | A1* | 12/2021 | Amiri ..................... G06K 9/629 |

FOREIGN PATENT DOCUMENTS

| | | | |
|---|---|---|---|
| CN | 105208456 A | | 12/2015 |
| CN | 110433491 A | | 11/2019 |
| WO | 2013085768 A2 | | 6/2013 |
| WO | 2019143780 A1 | | 7/2019 |
| WO | 2019226964 A1 | | 11/2019 |
| WO | WO-2021212089 A1 | * | 10/2021 |

OTHER PUBLICATIONS

Bose, Joey, "Virtual Fakes: DeepFakes for Virtual Reality", Downloaded Oct. 20, 2020, 1 page, <https://ieeexplore.ieee.org/document/8901744>.

Brasnett et al., "Multi-Resolution Parametric Region Tracking for 2D Object Replacement in Video", 2004 International Conference on Image Processing (ICIP), 5 pages.

Bursztynsky, Jessica, "Verizon CEO sees functioning 5G wireless in half the US next year", Published Thu, Aug. 1, 2019, 5 pages, <https://www.cnbc.com/2019/08/01/verizon-ceo-sees-functioning-5g-wireless-in-half-the-us-next-year.html>.

Yadav et al., "Deepfake: A Survey on Facial Forgery Technique Using Generative Adversarial Network", Proceedings of the International Conference on Intelligent Computing and Control Systems (ICICCS 2019), IEEE Xplore Part No. CFP19K34-ART; ISBN: 978-1-5386-8113-8, 6 pages.

Finlay, JP, "Orioles", Apr. 29, 2015, 6 pages, <https://www.nbcsports.com/washington/balitmore-orioles/orioles-playing-empty-stadium-was-quite-strange>.

Linly, Zack, "LeBron James on Playing With No Fans in Attendance Due to Coronavirus Scare: 'Nah'", Mar. 8, 2020, 6 pages, <https://www.theroot.com/lebron-james-on-playing-with-no-fans-in-attendance-due-1842193913>.

Sen-Ching et al., "Efficient Object-Based Video Inpainting", ©2006 IEEE, ICIP 2006, 4 pages.

Siarohin et al., "First Order Motion Model for Image Animation", 33rd Conference on Neural Information Processing Systems (NeurIPS 2019), 11 pages, <http://papers.nips.cc/paper/8935-first-order-motion-model-for-image-animation.pdf>.

* cited by examiner

DYNAMIC VIRTUAL AUDIENCE GENERATION

BACKGROUND

The present invention relates generally to the field of machine learning, and more particularly to virtual audience generation.

A generative adversarial network (GAN) is a class of machine learning system comprising of two neural networks. Given a training set, a GAN learns to generate new data with the same statistics as the training set. For example, a GAN trained on photographs can generate new photographs that look at least superficially authentic to human observers. The generative network generates candidates while the discriminative network evaluates the generated candidates. Typically, the generative network learns to map from a latent space to a data distribution of interest, while the discriminative network distinguishes candidates produced by the generator from the true data distribution. The generative network's training objective is to increase the error rate of the discriminative network (i.e., inducing misclassifications by the discriminator network by producing novel candidates that the discriminator thinks are not synthesized (are part of the true data distribution)).

SUMMARY

Embodiments of the present invention disclose a computer-implemented method, a computer program product, and a system. The computer-implemented method includes one or more computer processors creating a user-event localization model for an identified remote audience member in a plurality of identified remote audience members for an event. The one or more computer processors generate a virtual audience member based the identified remote audience member utilizing a trained generated adversarial network and one or more user preferences. The one or more computer processors present the generated virtual audience member in a location associated with the event. The one or more computer processors dynamically adjust a presented virtual audience member responsive to one or more event occurrences utilizing the created user-event localization model.

DETAILED DESCRIPTION

Live event (e.g., sports, esports, and music) experiences are heavily influenced by a live and present audience with elements of audience participation (e.g., noise and interactions). For example, audience noise affects player performance during live sports or audience gasps reinforce emotional scenes in a theater play. Unfortunately, there exists situations and scenarios where live audiences (e.g., physically present) are restricted or prohibited. Frequently, when live audiences are prohibited, event participants have performed, acted, and/or played in empty locations (e.g., stadiums, theaters, arenas, etc.) lacking the emotional content of audiences (e.g., cheering for their favorite team and/or player). Further, the lack of a "home team" audience removes a home team advantage that many sports and teams gain from being playing in a home stadium. For example, in basketball games, the audience typically creates substantial noise to distract the opposing team in critical moments, such as free throws or inbounding a ball. Current solutions allow a direct stream of virtual audience members but, typically, said solutions lack visual fidelity, solely focus on the visual representation of the user rather than including auditory reactions, and suffer from large durations (i.e., lag) of time between an event occurrence (e.g., a slam dunk in a basketball game) and a user reaction or response.

Embodiments of the present invention propose a method to dynamically generate one or more virtual audience members utilizing machine learning techniques. Embodiments of the present invention generate virtual footage of a user utilizing one or more source images and videoclips, where the user has the rights (e.g., copyright) and authority to provide and modify the source images. Embodiments of the present invention recreate the experience of playing in front of live audience with virtual audience members. Embodiments of the present invention dynamically alter audience reactions and amplitude utilizing historical and current events. Embodiments of the present invention create one or models utilizing extracted localized contextual awareness of an event. Embodiments of the present invention stitch audience reactions, in real time, to occurrences within an event. Embodiments of the present invention incorporate virtual audiences in live events while dynamically adjusting the audience responsive to changes in the event and real time reactions of one or more virtual audience members. Embodiments of the present invention incorporate event context into audience generation producing an appropriate reaction at an appropriate time (e.g., gasp at a dramatic scene, increasing noise in crucial points in a sports match, etc.). Implementation of embodiments of the invention may take a variety of forms, and exemplary implementation details are discussed subsequently with reference to the Figures.

The present invention will now be described in detail with reference to the Figures.

Figure 1:
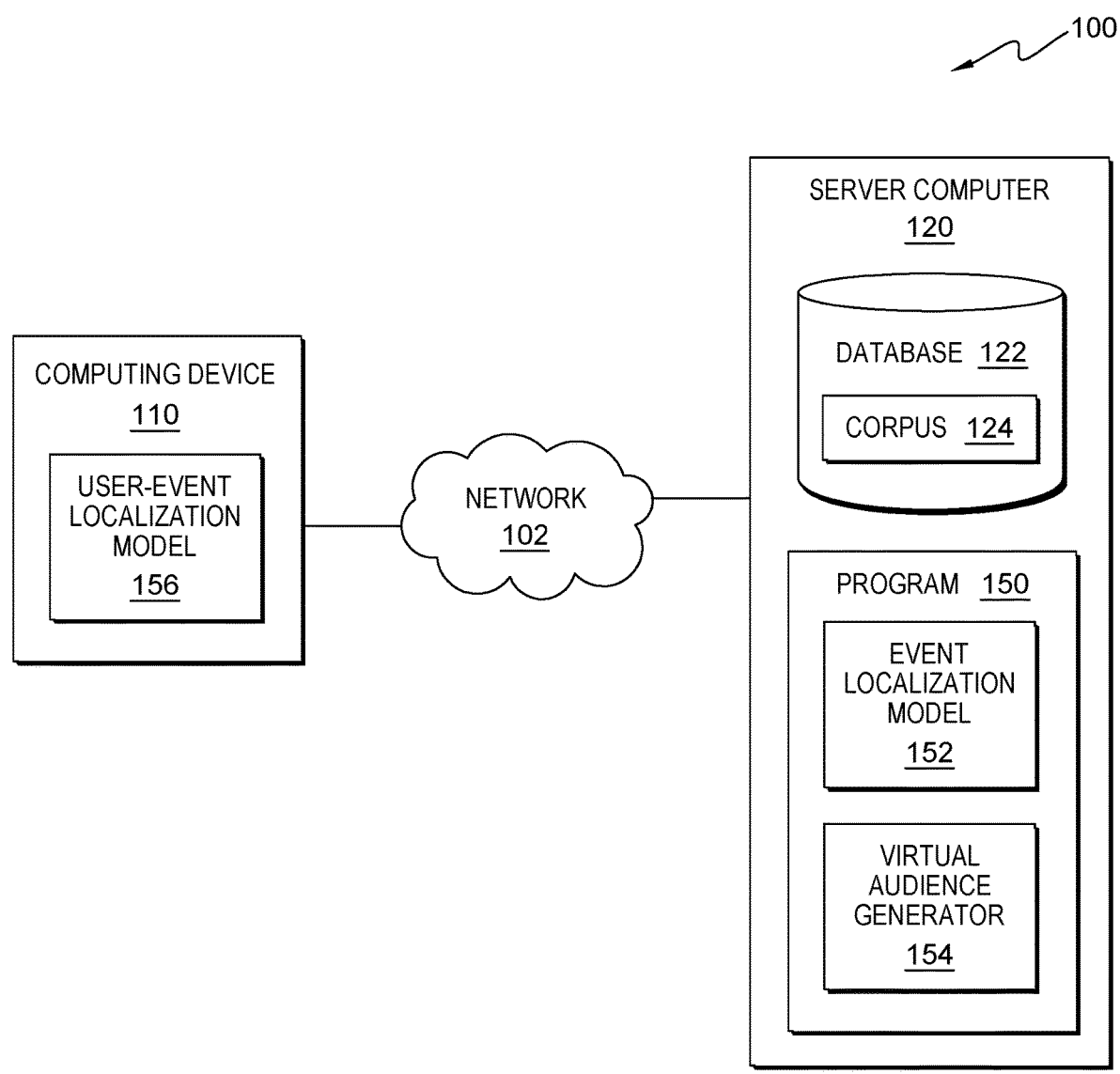
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes computing device 110 and server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between computing device 110, server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.). In the depicted embodiment, computational environment 100 is a fifth-generation broadband cellular network in which the service area is divided into small geographical areas called cells.

Computing device 110 may be any electronic device or computing system capable of processing program instructions and receiving and sending data. In some embodiments, computing device 110 may be a laptop computer, a tablet computer, a netbook computer, a personal computer (PC), a desktop computer, a personal digital assistant (PDA), or any programmable electronic device capable of communicating with network 102. In another embodiment, computing device 110 is an edge device (e.g., smart phone) in a fifth-generation wireless environment. Smart phones may be used as a telephone, digital camera and video camera, global positing system (GPS) navigation, a media player, clock, news, calculator, web browser, handheld video game player, flashlight, compass, an address book, note-taking, digital messaging, an event calendar, etc. In another embodiment, computing device 110 is a wearable computer such as a smartwatch or a fitness tracker. Wearable computers are miniature electronic devices that may be worn by the bearer under, with, or on top of clothing, as well as in or connected to glasses, hats, or other accessories. Fitness trackers are devices or applications for monitoring and tracking fitness-related metrics such as user speed, acceleration, change in direction, distance traveled, calorie consumption, and biometric data such as heart and perspiration rates. In an embodiment, program 150 monitors user reactions to event occurrences (i.e., micro-events (e.g., a goal scored in a soccer game), sequence of preceding micro-events, etc.) utilizing a camera, not depicted, associated with computing device 110. In other embodiments, computing device 110 may represent a server computing system utilizing multiple computers as a server system, such as in a cloud computing environment. In general, computing device 110 is representative of any electronic device or combination of electronic devices capable of executing machine readable program instructions as described in greater detail with regard to FIG. 4, in accordance with embodiments of the present invention. In the depicted embodiment, computing device 110 contains user-event localization model 156 which maps real-time user reactions to corresponding event occurrences.

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as user profiles, historical events (e.g., historical concerts, sports matches (e.g., basketball, football, soccer, etc.), and historical models. In this embodiment, user profiles comprise one or more event occurrence-user reaction mappings (i.e., historical event occurrences snippets labeled with an associated user reactions) and social media information. In the depicted embodiments, database 122 contains corpus 124.

Corpus 124 contains a plurality of event-based corpora that include event rules (e.g., rules associated with a sport), image corpora (i.e., associated images of event occurrences comprising the event (e.g., cheers associated with a plurality of images depicting completed free throws in a basketball game)), and associated emotional cues (e.g., gasps, laughter, etc.). In an embodiment, an event is comprised of a collection (i.e., temporally collocated) of one or more actions, a series of steps, or related interactions (e.g., sports match, birthday party, speech therapy session, public speaking course, etc.). In another embodiment, corpus 124 contains user-based corpora containing user information comprising user reactions (i.e., reaction (e.g., cheer, scream, cry, etc.) and reaction amplitude (e.g., intensity, level, amount, etc.) associated with one or more corresponding event occurrences. For example, a user is associated with a specific level (i.e., amplitude) of cheer associated with viewing a completed free throw in a basketball game (i.e., event occurrence). In an embodiment, corpus 124 contains one or more historical generated virtual user representations (i.e., virtual audience members) and related user information (e.g., reaction range). In another embodiment, corpus 124 contains historical geographical locations (e.g., San Francisco area) with associated user sentiments comprising aggregated sentiments (i.e., emotion and/or reaction) to one or more event occurrences, acoustics (e.g., amplitude of the reaction (e.g., intensity of a cheer)), event context (e.g., preceding and current event occurrences), and user preferences (e.g., privacy levels, preferred styling, enabled devices, etc.). In an embodiment, corpus 124 is categorized, organized, and/or structured in relation to a specific user, individual, location, sentiment, team, sport, division, and/or conference. For example, all historical generated image representations related to a location are structured together. In various embodiments, corpus 124 is temporally structured. For example, corpus 124 is constrained or limited with regards to a temporal period (e.g., events that have transpired in the last month).

Program 150 is a program for dynamically generating virtual audiences. In various embodiments, program 150 may implement the following steps: create a user-event localization model for an identified remote audience member in a plurality of identified remote audience members for an event; generate a virtual audience member based the identified remote audience member utilizing a trained generated adversarial network and one or more user preferences; present the generated virtual audience member in a location associated with the event; and dynamically adjust a presented virtual audience member responsive to one or more event occurrences utilizing the created user-event localization model. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any other computing device (not depicted) within computational environment 100. In the depicted embodiment, program 150 includes event localization model 152 and virtual audience generator 154. Program 150 is depicted and described in further detail with respect to FIG. 2.

Event localization model 152 and user-event localization model 156 are representative of one or more models utilizing deep learning techniques to train, calculate weights, ingest inputs, and output a plurality of solution vectors. In an embodiment, event localization model 152 and user-event localization model 156 are comprised of any combination of deep learning model, technique, and algorithm (e.g., decision trees, Naive Bayes classification, support vector machines for classification problems, random forest for classification and regression, linear regression, least squares regression, logistic regression). In an embodiment, event localization model 152 and user-event localization model 156 each utilize transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In an embodiment, program 150 creates and trains event localization model 152 to "learn" the rules, mechanisms, and emotional cues of an event. In an embodiment, responsive to the training of an accurate event localization model, program 150 incorporates user information for a specific user or a group of users and creates user-event localization model 156. In this embodiment, program 150 creates a user-event localization model for each user, where user-event localization model is controlled by one or more user preferences (e.g., privacy level, data sharing permissions, user image permissions, avatar specifications, geographical permissions, etc.). In another embodiment, program 150 utilizes user-event localization model 156 to create one or more user-event occurrence mappings that correlate an event occurrence with a predicted reaction and amplitude for a user.

Virtual audience generator 154 is a virtual audience generative adversarial network (GAN) comprising two adversarial neural networks (i.e., generator and discriminator) trained utilizing unsupervised and supervised methods with images representative of the intended audience style (e.g., reaction type, image style, varying degrees of privacy or obfuscation) associated with event occurrences. In an embodiment, program 150 trains a discriminator utilizing known data as described in corpus 124. In another embodiment, program 150 initializes a generator utilizing randomized input data sampled from a predefined latent space (e.g. a multivariate normal distribution), thereafter, candidates synthesized by the generator are evaluated by the discriminator. In this embodiment, program 150 applies backpropagation to both networks so that the generator produces better images, while the discriminator becomes more skilled at flagging synthetic images. In the depicted embodiment, the generator is a deconvolutional neural network and the discriminator is a convolutional neural network. The creation, training, and utilization of event localization model 152, virtual audience generator 154, and user-event localization model 156 is depicted and described in further detail with respect to FIG. 2.

The present invention may contain various accessible data sources, such as database 122 and corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
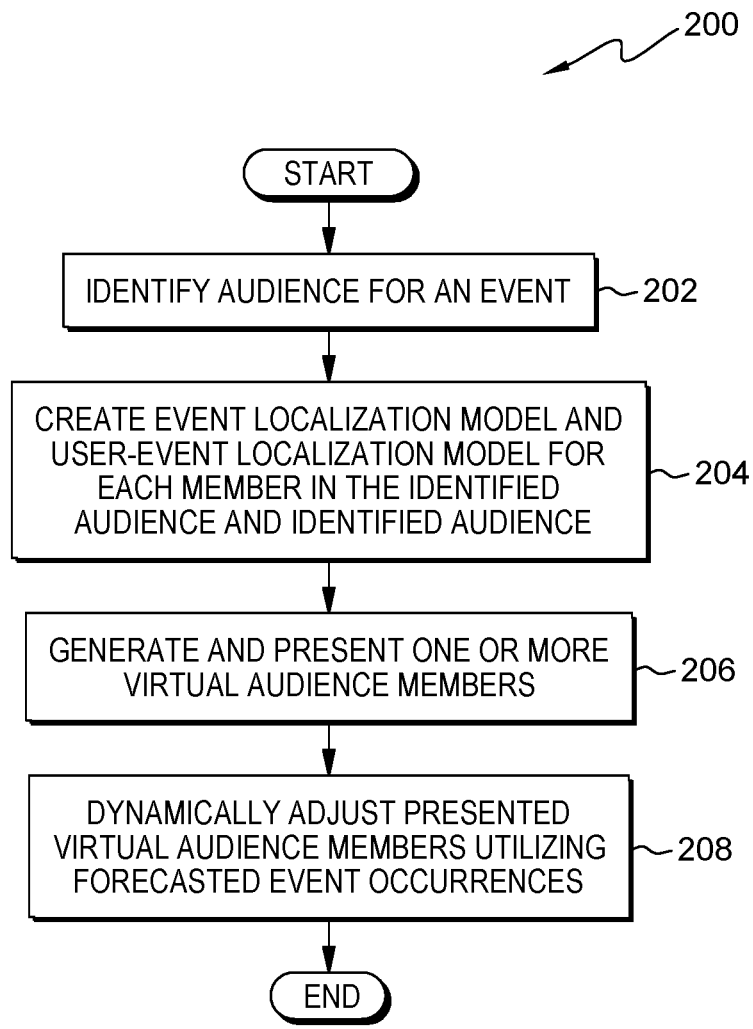
FIG. 2 is a flowchart depicting operational steps of a program, on a server computer within the computational environment of FIG. 1, for dynamically generating virtual audiences, in accordance with an embodiment of the present invention.

FIG. 2 depicts flowchart 200 illustrating operational steps of program 150 for dynamically generating virtual audiences, in accordance with an embodiment of the present invention.

Program 150 identifies an audience for an event (step 202). In an embodiment, program 150 initiates responsive to the commencement (e.g., the start of a televised performance) of an event or responsive to a user action such as a user prompt or user initiation (e.g., user opening a live stream and/or associated application). In an embodiment, program 150 identifies an audience for the event (e.g., basketball game), where the audience comprises a plurality of remote users (i.e., audience members), physically separated from the event. In another embodiment, program 150 retrieves a user profile associated with each remote user, where each user profile maps reactions (e.g., shock, elation, tragedy, etc.) and associated amplitudes (e.g., reaction duration, strength, and tone differentiation) to event occurrences. In an embodiment, the user profile contains historical event occurrences and related metadata (e.g., time, location, event category, associated social media, etc.), labelled with one or more associated user reactions and amplitudes. In another embodiment, the user profile contains user permissions and user preferences regarding reaction monitoring during a live event utilizing one or more computing devices associated with the user (e.g., camera on a mobile phone or edge device).

In an embodiment, responsive to a user without an associated profile, program 150 creates a new user profile for the user utilizing aggregated profiles from users with similarities such as respective geographical area, event type, or event association (e.g., cheering for the same team or for the same event occurrence (e.g., different fan bases collectively cheering for a rival team to lose)). In an embodiment, program 150 retrieves a plurality of social network information associated the user that includes profiles, liked interests, posts, and comments. In this embodiment, program 150 analyzes the social network information using natural language processing techniques (e.g., sentence splitting, tokenization, entity extracting, part-of-speech tagging, chunking, dependency parsing, and anaphora resolution, etc.) to process semantics of the user text and determine the interests of the user. In an embodiment, program 150 retrieves all social network posts, tokenizes said posts, and extracts individual words and phrases. In a further embodiment, program 150 utilizes entity extraction to parse feature sets, such as associated locations and sentiments. In another embodiment, after program 150 identifies one or more features, program 150 utilizes part-of-speech tagging to identify specific interests. For example, a user posts "I love regional basketball" or "I hope this team loses on Monday" on a social network. In this example, program 150 utilizes natural language processing techniques to associate the user with specific events and potential reactions to expected event occurrences.

Program 150 creates an event localization model for the event and a user-event localization model for each member in the identified audience (step 204). In an embodiment, program 150 creates an event localization model (e.g., event localization model 152) for the event and the identified audience. In this embodiment, program 150 creates and trains the event localization model to learn the rules, mechanisms, and emotional cues of an event. For example, the event localization model associates a lead changing three-point shot (i.e., event occurrence) in a basketball event with tremendous (i.e., high amplitude) cheering associated with fans (i.e., audience members) of the leading team. In an embodiment, the event localization model is a convolutional neural network trained to identify images and video sequences with corresponding event rules and a plurality of user reactions and amplitudes. In this embodiment, program 150 trains the event localization model with images and videos (e.g., corpus 124) labeled with appropriate user reactions for multiple event audience members with varying perspectives (e.g., winning team user, losing team user, disinterested user, home team user, etc.). In an embodiment, responsive to the training of an accurate event localization model, program 150 incorporates user information for a specific user or a group of users into the model creating a user-event localization model. In this embodiment, program 150 creates a model for each user restricted by one or more user preferences (e.g., privacy level, data sharing permissions, user image permissions, avatar specifications, geographical permissions, etc.). In another embodiment, program 150 creates one or more user-event occurrence mappings that correlate an event occurrence with a predicted reaction for a user and subsequent reaction generation. In an embodiment, program 150 distributes a trained user-event localization model specific to a user to an edge device (i.e., computing device 110) associated with the user. For example, as a user views an event, a corresponding user-event localization model is monitoring and capturing user reactions to real time event occurrences and retraining the model based on observed reactions (i.e., actual user reaction to the occurrence). In a further embodiment, program 150 groups user associated edge devices with similar (e.g., geographically, event associations, user interests, etc.) edge devices, allowing the edge devices to communicate and aggregate user reactions. In another embodiment, retrained user-event localization models are pushed back to program 150 and utilized to predict user reactions to real time event occurrences.

Program 150 generates and presents one or more virtual audience members for the event (step 206). In an embodiment, program 150 creates a generative adversarial network (e.g., virtual audience generator 154) comprising a generator model and a discriminator model. In this embodiment, program 150 trains said models utilizing supervised methods with images representative of the intended image style. In an embodiment, the user indicates a particular image style such an avatar, sample photo, or a style producing varying levels of privacy or obfuscation. In the depicted embodiment, the generator is a deconvolutional neural network and the discriminator is a convolutional neural network. In an embodiment, program 150 trains the GAN utilizing user social media images to generate a realistic representation (e.g., avatar) of the user through identifying, processing, and covering a plurality of facial angles and expressions for reconstruction. In this embodiment, program 150 creates an electronic representation of the user (i.e., avatar) considering a broad range of expressions, reactions, amplitudes, and gestures. In the situation where the user provides no social media or does not have sufficient training images, program 150 utilizes public and genericized images to provide training images. In another embodiment, program 150 utilizes a live stream perspective of the user as a basis for virtual audience generation. In an embodiment, program 150 generates user avatars based on respective user preferences and privacy parameters. In this embodiment, program 150 provides generated avatars ranging from high obfuscated or genericized avatars to photo-realistic representations of the user. In an embodiment, program 150 generates a video sequence (e.g., live avatar) of a user so that the user is animated according to the motion of a corresponding user reaction. In a further embodiment, program 150 generates user representations (i.e., virtual audience members) that consist of a set of learned key points with corresponding local affine transformations to support complex reactions. In a further embodiment, program 150 utilizes generator network model occlusions that arise during targeted reactions and combines the appearance extracted from the source image (e.g., user real-time reaction) and motion derived from the predicted reaction corresponding with the event occurrence.

In an embodiment, program 150 presents and/or adjusts the generated image representations dependent on the capabilities (e.g., display size, resolution, etc.) of the associated application (e.g., chat application, etc.) or associated computing devices. In various embodiments, program 150, displays, modifies, or presents one or more generated image representations. For example, program 150 displays the generated virtual audience members in an event location (e.g., basketball court). In this example, each generated virtual audience member is visible to the participants of the event. In an embodiment, program 150 projects generated audience members (i.e., generated video sequences) using screens, projector devices on human mannequins, and existing audio systems on event premises.

In another embodiment, program 150 projects generated audience members in a location associated with a user such as in a virtual reality system or augmented reality system. For example, a user associated with a basketball team is seated with related users or a preferred section (e.g., controlled by user preferences) from the perspective of the user, where this generated view can be distinct from the virtual audience presented in the location associated with the event. In a further embodiment, each presented virtual audience member comprises an auditory output device configured to transmit determined and predicted user reactions based on real-time event occurrences. In an embodiment, each generated virtual member is copied and distributed (e.g., distributed based on team affiliation) through an event location if more virtual audience members are needed to meet an audience member threshold or restriction. In an example, a baseball game has a restriction requiring that 75% of virtual audience members presented in the event location be associated with the home team. In this example, if there exists a lack of available audience members necessary to fulfill the requirement, program 150 duplicates and links one or more presented virtual audience members, allowing audience members to control a plurality of presented audience members. In various embodiments, program 150 activates in-event bonuses or obstacles depending on audience threshold such as how many audience members are reacting, how the audience members are reacting, and/or with what intensity the audience members are reacting. In an example concert performance, audience members control event lighting effects based on aggregated reactions and associated sentiments responsive to event occurrences. In another example, during an eSports event, audience members cheering for losing team can provide in-game bonuses to the players based on the determined reactions and associated amplitude thresholds.

Program 150 dynamically adjusts presented virtual audience members utilizing forecasted event occurrences (step 208). In an embodiment, program 150 utilizes the localization model to forecast potential event occurrences and predict relevant virtual audience responses. In this embodiment, program 150 continuously inputs a video stream into the trained event localization model, utilizing said model to output a plurality of predicted event occurrences and associated predicted audience reactions and amplitudes. In a further embodiment, program 150 predicts one or more user reactions to predicted event occurrences. For example, during an interception in a football game, program 150 predicts that fans of the intercepted team would react disappointed and starts to present associated virtual audience members as disappointed. In an alternative example, an example user is a fan of the intercepted team but program 150 determines from an associated user profile that the player that intercepted the ball is on the fantasy football team of the user. In this example, program 150 utilizes a trained user-specific event localization model to consider said information and produce an appropriate user reaction such as mild excitement. In an embodiment, if the presented predicted reaction is substantially different than the current reaction from the monitored user then program 150 progressively regenerates the associated virtual audience member to the correct reaction. In a further embodiment, program 150 utilizes predicted user reactions for significant event occurrences (i.e., event occurrences that elicit user reactions intended to significant distract or aid the event (e.g., yelling during a last minute field goal in a football game)) and progressively shifts (e.g., user representation regeneration) an associated presented user avatar to a live feed of the user.

In an embodiment, program 150 restricts (i.e., the GAN is restricted, constrained, modified, etc.) the image generator model utilizing one or more user preferences (e.g., transmission methods, associated computing devices, etc.) and user privacy parameters (e.g., allowed location information, allowed avatar details (e.g., hair color, unique facial features, sentiment ranges (e.g., do not allow anger or negative emotions), etc.), etc.). For example, the user designates that no personal information be present in the generated image, thus program 150 generates an image representation only containing a genericized avatar with little to no expressed reaction. In another embodiment, program 150 adjusts virtual audience members based on one or more objectives associated with the event such as minimizing or maximizing advertisement revenue or duration, expanding, or limiting event time, etc.

Figure 3:
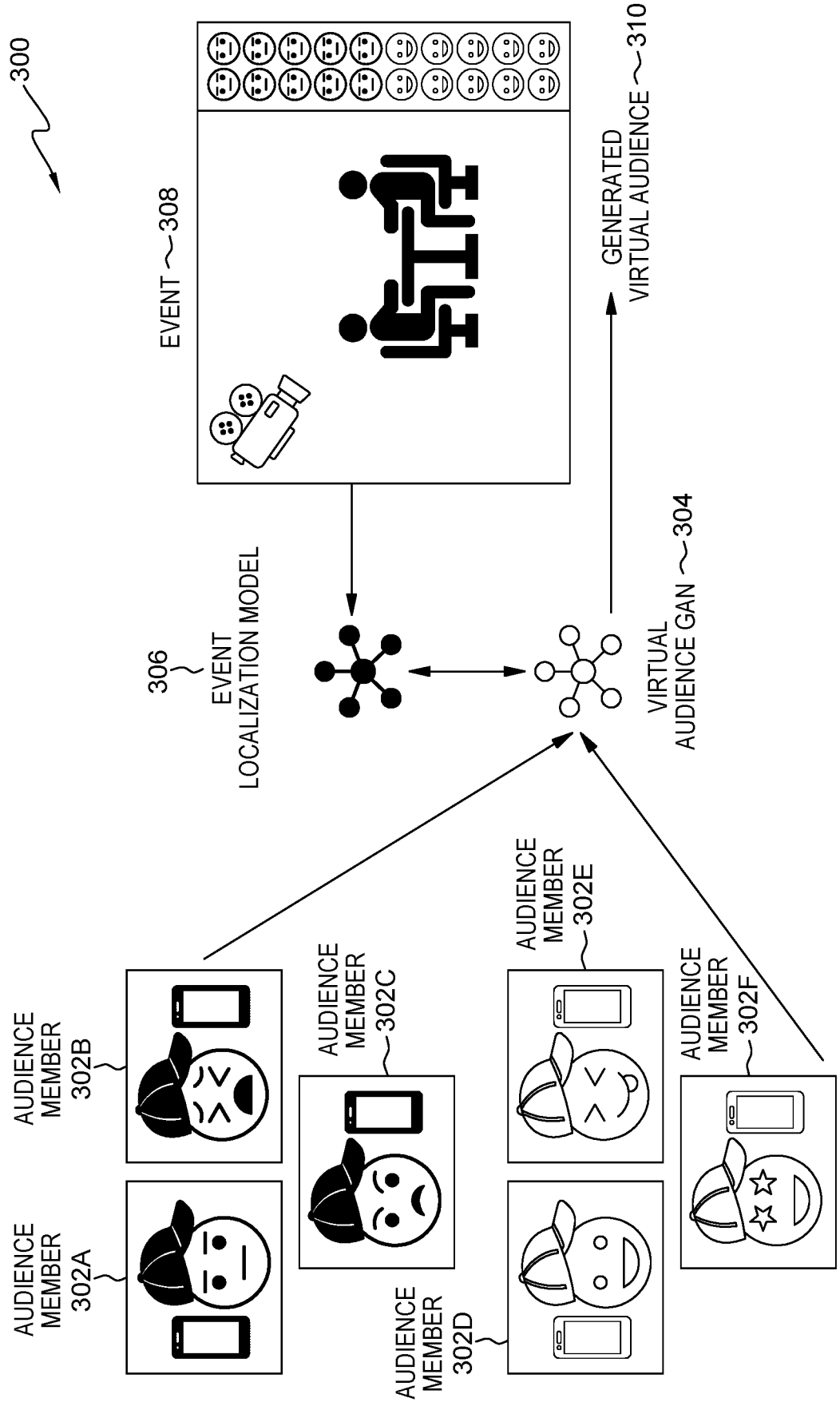
FIG. 3 is an exemplary illustration 300 depicting operational steps of a program within the computational environment of FIG. 1, in accordance with an embodiment of the present invention.

FIG. 3 depicts exemplary illustration 300, in accordance with an illustrative embodiment of the present invention. Exemplary illustration 300 depicts program 150 generating a virtual audience for an event. Exemplary illustration 300 contains audience member 302A-302F, each associated with one or more user preferences associated with event 308 and a mobile device in a networked environment. In exemplary illustration 300, program 150 monitors audience member 302A-302F, extracting audience information and incorporating the audience information into virtual audience GAN 304 to generate a plurality of virtual audience members (i.e., generated virtual audience 310). Generated virtual audience is presented to the participants located in a location associated with event 308 and to audience member 302A-302F. Program 150 continuously adjusts generated virtual audience 310 responsive to event localization model 306 receiving real-time input from event 308 and utilizing extracted event contextual as an input for virtual audience GAN 304. As event 308 progresses, program 150 predicts the likelihood of one or more significant actions or subsequences (i.e., actions or subsequences that are impacted or affected by audience reactions) and predicts how audience member 302A-302F may react to said actions. As one of the predicted actions occurs, in real time, program 150, initially, updates generated virtual audience 310 with one or more predicted user reactions. Simultaneously, program 150 monitors the real time reactions of audience member 302A-302F and reconciles said reaction with the predicted reaction, eventually presenting one or more real time reactions of audience member 302A-302F.

Figure 4:
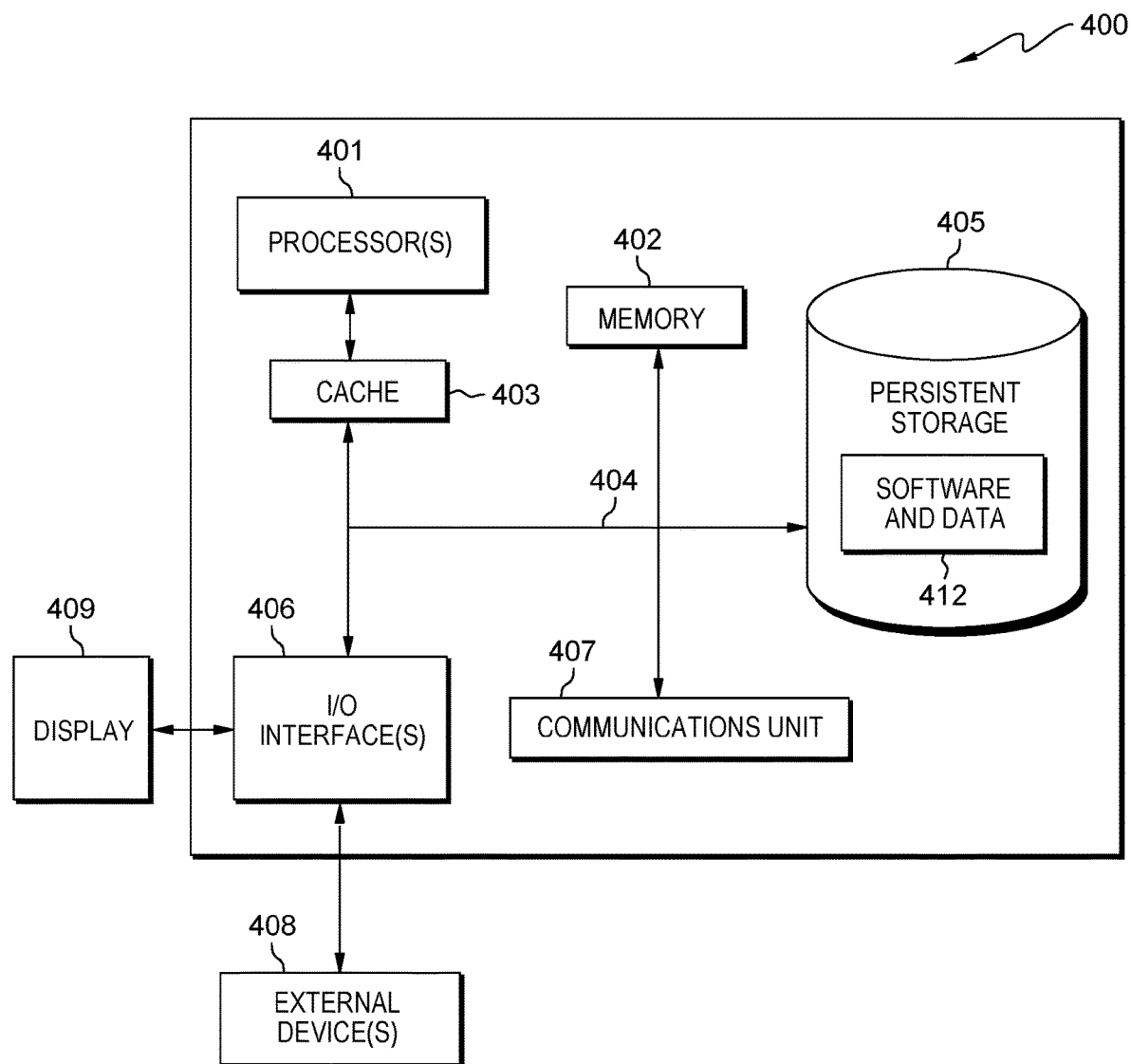
FIG. 4 is a block diagram of components of the server computer, in accordance with an embodiment of the present invention.

FIG. 4 depicts block diagram 400 illustrating components of computing device 110 and server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 110 and server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 can be stored in persistent storage 405 for access and/or execution by one or more of the respective processors 401 via cache 403.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q #, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
creating, by one or more computer processors, a user-event localization model for an identified remote audience member in a plurality of identified remote audience members for an event;
generating, by one or more computer processors, a virtual audience member based the identified remote audience member utilizing a trained generated adversarial network and one or more user preferences;
presenting, by one or more computer processors, the generated virtual audience member in a location associated with the event; and
dynamically adjusting, by one or computer processors, a presented virtual audience member responsive to one or more event occurrences utilizing the created user-event localization model.

2. The computer-implemented method of claim 1, wherein dynamically adjusting the presented virtual audience member responsive to the one or more event occurrences utilizing the created user-event localization model, comprises:
predicting, by one or more computer processors, a user reaction and amplitude utilizing the created user-event localization model based on a real time event occurrence.

3. The computer-implemented method of claim 2, further comprising:
regenerating, by one or more computer processors, the virtual audience member utilizing the predicted user reaction; and
presenting, by one or more computer processors, the regenerated virtual audience member.

4. The computer-implemented method of claim 3, further comprising:
monitoring, by one or computer processors, the user reaction to the real time event occurrence; and
progressively regenerating, by one or more computer processors, the presented regenerated virtual audience member to match the user reaction.

5. The computer-implemented method of claim 4, further comprising:
retraining, by one or more computer processors, the created user-event location model based on the monitored user reaction.

6. The computer-implemented method of claim 1, wherein the user-event localization model maps one or more event occurrences with one or more user reactions.

7. The computer-implemented method of claim 1, further comprising:
copying, by one or more computer processors, the presented virtual audience member to meet an audience member threshold.

8. The computer-implemented method of claim 1, further comprising:
presenting, by one or more computer processors, a generated virtual audience in a location associated with the identified remote audience member.

9. A computer program product comprising:
one or more computer readable storage media and program instructions stored on the one or more computer readable storage media, the stored program instructions comprising:
program instructions to create a user-event localization model for an identified remote audience member in a plurality of identified remote audience members for an event;

program instructions to generate a virtual audience member based the identified remote audience member utilizing a trained generated adversarial network and one or more user preferences;

program instructions to present the generated virtual audience member in a location associated with the event; and program instructions to dynamically adjust a presented virtual audience member responsive to one or more event occurrences utilizing the created user-event localization model.

10. The computer program product of claim 9, wherein the program instructions, to dynamically adjust the presented virtual audience member responsive to the one or more event occurrences utilizing the created user-event localization model, comprise:

program instructions to predict a user reaction and amplitude utilizing the created user-event localization model based on a real time event occurrence.

11. The computer program product of claim 10, wherein the program instructions, stored on the one or more computer readable storage media, further comprise:

program instructions to regenerate the virtual audience member utilizing the predicted user reaction; and program instructions to present the regenerated virtual audience member.

12. The computer program product of claim 11, wherein the program instructions, stored on the one or more computer readable storage media, further comprise:

program instructions to monitor the user reaction to the real time event occurrence; and program instructions to progressively regenerate presented regenerated virtual audience member to match the user reaction.

13. The computer program product of claim 12, wherein the program instructions, stored on the one or more computer readable storage media, further comprise:

program instructions to retrain the created user-event location model based on the monitored user reaction.

14. The computer program product of claim 9, wherein the user-event localization model maps one or more event occurrences with one or more user reactions.

15. A computer system comprising:

one or more computer processors;

one or more computer readable storage media; and program instructions stored on the computer readable storage media for execution by at least one of the one or more processors, the stored program instructions comprising:

program instructions to create a user-event localization model for an identified remote audience member in a plurality of identified remote audience members for an event;

program instructions to generate a virtual audience member based the identified remote audience member utilizing a trained generated adversarial network and one or more user preferences;

program instructions to present the generated virtual audience member in a location associated with the event; and program instructions to dynamically adjust a presented virtual audience member responsive to one or more event occurrences utilizing the created user-event localization model.

16. The computer system of claim 15, wherein the program instructions, to dynamically adjust the presented virtual audience member responsive to the one or more event occurrences utilizing the created user-event localization model, comprise:

program instructions to predict a user reaction and amplitude utilizing the created user-event localization model based on a real time event occurrence.

17. The computer system of claim 16, wherein the program instructions, stored on the one or more computer readable storage media, further comprise:

program instructions to regenerate the virtual audience member utilizing the predicted user reaction; and program instructions to present the regenerated virtual audience member.

18. The computer system of claim 17, wherein the program instructions, stored on the one or more computer readable storage media, further comprise:

program instructions to monitor the user reaction to the real time event occurrence; and program instructions to progressively regenerate presented regenerated virtual audience member to match the user reaction.

19. The computer system of claim 18, wherein the program instructions, stored on the one or more computer readable storage media, further comprise:

program instructions to retrain the created user-event location model based on the monitored user reaction.

20. The computer system of claim 15, wherein the user-event localization model maps one or more event occurrences with one or more user reactions.

\* \* \* \* \*